(12) United States Patent
Wieke et al.

(10) Patent No.: US 9,481,153 B2
(45) Date of Patent: Nov. 1, 2016

(54) METHOD FOR PRODUCING LEATHER PARTS

(75) Inventors: Martin Wieke, Karlsruhe (DE); Daniel Moldaschel, Kuchen (DE); Thomas Christof Bader, Goeppingen (DE)

(73) Assignee: Bader GmbH & Co. KG, Goeppingen (DE)

(*) Notice: Subject to any disclaimer, the term of this patent is extended or adjusted under 35 U.S.C. 154(b) by 0 days.

(21) Appl. No.: 13/820,831

(22) PCT Filed: Sep. 16, 2011

(86) PCT No.: PCT/EP2011/066115
§ 371 (c)(1),
(2), (4) Date: Mar. 5, 2013

(87) PCT Pub. No.: WO2012/045565
PCT Pub. Date: Apr. 12, 2012

(65) Prior Publication Data
US 2013/0168014 A1    Jul. 4, 2013

(30) Foreign Application Priority Data
Oct. 7, 2010    (DE) .................. 10 2010 042 103

(51) Int. Cl.
*B32B 37/14* (2006.01)
*B32B 5/02* (2006.01)
*B32B 5/18* (2006.01)
*C14B 7/02* (2006.01)
(Continued)

(52) U.S. Cl.
CPC ............... *B32B 37/14* (2013.01); *B32B 5/02* (2013.01); *B32B 5/18* (2013.01); *B32B 9/025* (2013.01);
(Continued)

(58) Field of Classification Search
CPC ............ C14B 7/02; C14B 7/04; B32B 38/00; B32B 38/04; B32B 5/02; B32B 5/18; B32B 37/14

USPC .......................................... 156/254, 256, 264
See application file for complete search history.

(56) References Cited

U.S. PATENT DOCUMENTS 2,136,092 A * 11/1938 Troy ............................. 156/163
2,737,597 A *  3/1956 Strobino .................... 250/516.1
(Continued)

FOREIGN PATENT DOCUMENTS

DE      1 660 078       4/1971
DE     16 60 078        4/1971
(Continued)

OTHER PUBLICATIONS

International Search Report of PCT/EP2011/066115, date of mailing Feb. 14, 2012.
(Continued)

*Primary Examiner* — Mark A Osele
*Assistant Examiner* — Christopher C Caillouet
(74) *Attorney, Agent, or Firm* — Collard & Roe, P.C.

(57) ABSTRACT

The invention relates to a method for producing leather parts (18), which can be processed using saddler technology, from prefabricated final leather (12) for the automotive field. The final leather is split in a splitting process (13) with the formation of a contiguous and closed thin leather hide (14) with a proportional thickness in relation to the final leather of from 15 to 50% and a split leather hide (15) with a proportional thickness of from 50 to 85%. The thin leather hide (14) is then cut to size in a die-cutting process with the formation of predefined thin leather blanks and is lined over the full area of its rear side with a complementary lining blank made from a textile, fibrous and/or foam material which is lighter in mass than leather. In principle, the split leather hide can also be trimmed, cut to size and optionally split to a desired thickness and lined with the formation of split leather parts (19) which can be processed using saddler technology.

8 Claims, 2 Drawing Sheets

Figure 1:
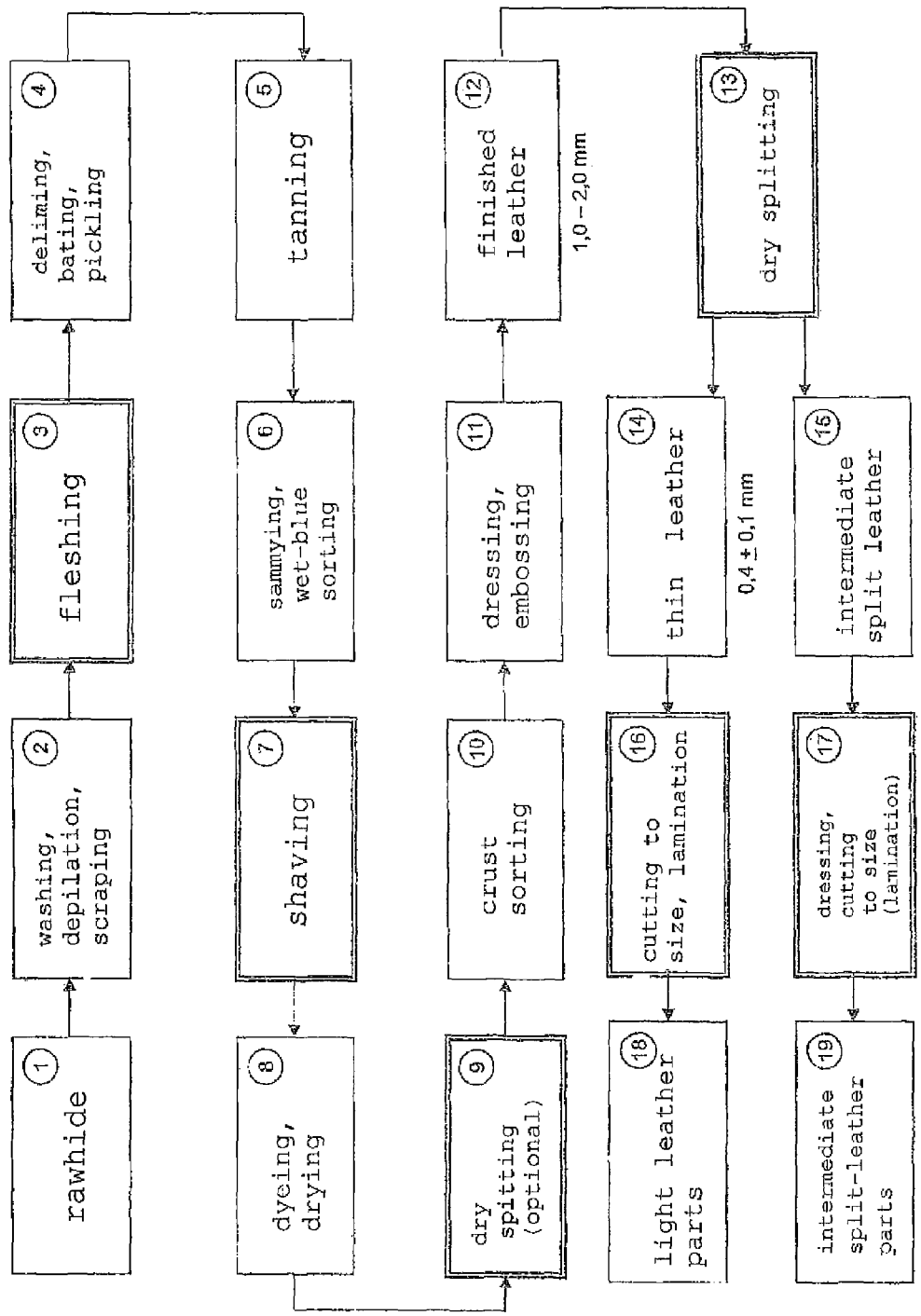

(51) Int. Cl.
 B32B 9/02 (2006.01)
 B32B 9/04 (2006.01)
 C14B 7/04 (2006.01)

(52) U.S. Cl.
 CPC ............... B32B 9/046 (2013.01); B32B 9/047 (2013.01); C14B 7/02 (2013.01); C14B 7/04 (2013.01); *B32B 2601/00* (2013.01); *B32B 2605/08* (2013.01); *Y10T 156/1062* (2015.01)

(56) References Cited

U.S. PATENT DOCUMENTS 6,395,656 B1* 5/2002 Jin et al. ................. 442/159
2004/0231786 A1* 11/2004 Habisreitinger et al. ..... 156/264

FOREIGN PATENT DOCUMENTS

| DE | 93 02 479 | 5/1993 |
| DE | 198 12 625 | 9/1999 |
| DE | 203 17 423 | 2/2004 |
| EP | 1 413 426 | 4/2004 |
| GB | 774 362 | 5/1957 |
| WO | WO 95/02072 | 1/1995 |

OTHER PUBLICATIONS

German Search Report dated Sep. 11, 2011 in European Patent Application No. DE 10 2010 042 103.0 with English translation of relevant parts.

* cited by examiner

METHOD FOR PRODUCING LEATHER PARTS

CROSS REFERENCE TO RELATED APPLICATIONS

This application is the National Stage of PCT/EP2011/066115 filed on Sep. 16, 2011, which claims priority under 35 U.S.C. §119 of German Application No. 10 2010 042 103.0 filed on Oct. 7, 2010, the disclosure of which is incorporated by reference. The international application under PCT article 21(2) was not published in English.

The invention relates to a method for the production of leather parts that can be processed using saddlery technology, from pre-manufactured finished leather, particularly for the automotive sector.

The starting point for the production of leather is always the raw animal hide, which, after washing, depilation, scraping, and splitting, is bated, pickled, delimed, and subsequently tanned. Afterward, tanning fluid is pressed out by way of a press, so that the moisture content is reduced to approximately 50 to 60%. In a further method step, the tanned animal hides are shaved, i.e. planed off to a uniform thickness on the order of 1 to 2 mm, on the back side, by means of a spiral blade roller. The remaining leather can now be dyed first, and then dried. The tanned, dyed, and dried leather is also called crust leather. After crust sorting, dressing of the leather finally takes place. This means, first, chemical surface coating, in which a primer, a color layer, and subsequently a protective varnish are applied. Optionally, priming can also be followed by embossing of the leather, which leads to characteristic surface structures. The result of this surface treatment is so-called finished leather, which is also referred to as standard leather. Finished leather is usually cut to predetermined shapes and outlines in the punching shop. In the case of automotive finished leather, one still has material thicknesses between 1 and 2 mm. On the other hand, the automotive industry is striving to achieve weight savings, as well.

Proceeding from this, the invention is based on the task of developing a method for the production of leather parts that can be processed using saddlery technology, from pre-manufactured, particularly dressed automotive finished leather, which is particularly light and nevertheless meets relatively great requirements with regard to stretchability, tensile strength, and easy workability.

To accomplish this task, the combination of characteristics described herein is proposed; advantageous embodiments and further developments of the invention are also described herein.

The invention proceeds from the recognition that finished leather is still accessible to a significant reduction in wall thickness if one correctly masters the splitting processes that can be used for this. In this manner, it is possible to achieve a wall thickness of the finished leather of as little as about 0.4 mm, in other words of about 15% to 50% of the usual wall thickness of the automotive finished leather, using a dry-splitting machine. On the other hand, such a reduction in wall thickness brings with it the risk that the tensile strength and the tear resistance of the leather are no longer sufficient to meet the requirements of robustness in use. In order to avoid this disadvantage, as well, it is proposed, according to the invention, that the finished leather is split up in a splitting process, with the formation of a cohesive and closed thin-leather hide, having a proportional wall thickness, with reference to the finished leather, of 15 to 50%, and an intermediate split-leather hide having a proportional wall thickness of 50 to 85%, that the thin-leather hide is cut to size in a punching process, with the formation of predetermined thin-leather cutouts, that lamination cutouts that are complementary to the thin-leather cutouts are produced from textile, fiber and/or foam material, which is specifically lighter as compared to leather, and that the lamination cutouts are laminated onto the back of the complementary thin-leather cutouts, over their full area, forming light leather parts. Here, the lamination cutouts above all have the task of increasing the tensile strength and the tear resistance of the light leather parts, without any significant increase in weight. At the same time, it is possible to influence the feel of the light leather parts in desired manner by means of a corresponding selection of the material composition in the lamination cutouts. A further criterion for the material selection for the lamination cutouts consists in that the stretchability of the thin-leather hide and of the lamination cutouts is coordinated, one with the other, in such a manner that the thin leather does not tear before the lamination material does, under mechanical stress.

A further feature of this production method consists in that in addition, an intermediate split-leather hide that has already been tanned occurs, which hide can be processed either directly or after corresponding treatment, using saddlery technology. It is advantageous, for this purpose, if the intermediate split-leather hide is dressed on its surface, for example dyed, varnished and/or embossed, and subsequently cut to size in a punching process, with the formation of predetermined intermediate split-leather cutouts for further processing using saddlery technology and, if necessary, split once more to a desired wall thickness. Fundamentally, it is possible that lamination cutouts made of textile or plastic material that are complementary to the punched leather cutouts are produced and laminated onto the back side of the complementary intermediate split-leather cutouts.

It is advantageous if the pre-manufactured finished leather has a starting wall thickness of 1.0 to 2.0 mm. The thin-leather hide accordingly has a wall thickness of at least 0.2 to 0.5 mm during the splitting process.

A preferred embodiment of the invention provides that the lamination cutouts are configured as multi-layer loom-knitted textiles. In particular, the lamination cutouts can be configured as spacer-loom-knitted fabrics having a wale layer enclosed between two loom-knitted fabric layers in sandwich-like manner. In order to be able to meet the requirements concerning stretchability of the lamination material in relation to the thin leather, it can be advantageous that the two loom-knitted fabric layers have different expansion values and/or tensile strengths. In this connection, it has proven to be advantageous if the lamination cutouts have a lower stretchability on their side that faces the thin-leather cutout or the intermediate split-leather cutout than on their other side.

On the other hand, the feel of the light leather parts can be advantageously influenced in that the lamination cutouts have an elastic cushioning layer, preferably configured as a fiber layer, on their broad side facing away from the thin-leather cutout or the intermediate split-leather cutout.

For the production of particularly thin-walled but nevertheless cohesive and closed thin leather hides from the finished leather, it is practical if the splitting process is carried out using a rotating band blade having an asymmetrical cutting wedge. Usually, the cutting wedge is ground to different thicknesses, whereby only the side with the lesser grinding faces the thin-leather hide to be produced.

Figure 2:
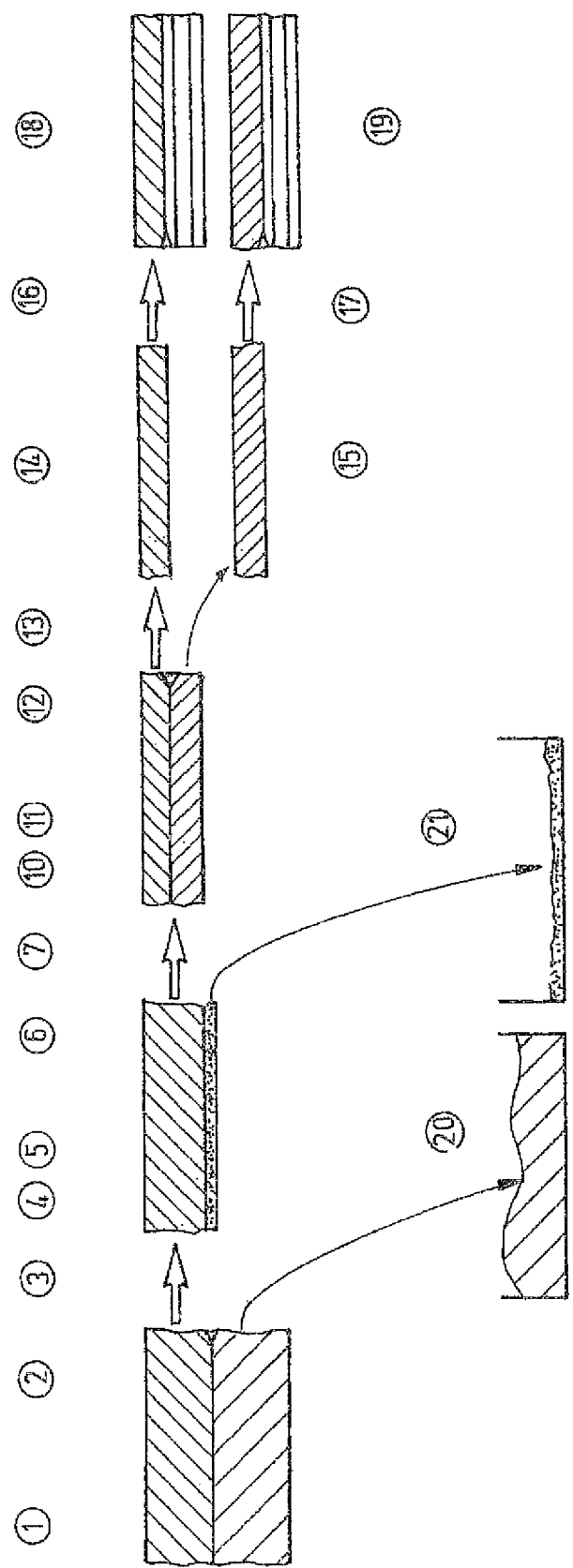

In the following, the invention will be explained in greater detail using a drawing. This shows:

FIG. 1 a block schematic with the essential method steps that are necessary for production of automotive finished leather and of light leather parts according to the invention;

FIG. 2 schematic sectional representations of the various method products that occur during the course of production of the light leather parts.

For the production of the light leather parts according to the invention, the method steps shown in FIG. 1, in a block schematic, must be carried out. In this connection, the previously known state of the art comprises the method steps indicated from the rawhide 1 to the finished leather 12:

After washing, depilation, and scraping in method step 2, so-called fleshing first takes place in method step 3, during which the hide is split to the desired thickness of approximately 2.2 to 2.6 mm. Afterward, the animal hide is delimed, bated, and pickled in method step 4. In this connection, swelling of the hide takes place, as does hide digestion, which improves penetration of the tanning substances into the hide, which is desirable during the subsequent tanning process 5. During tanning, irreversible bonding of tanning substances to the hide stabilizes and preserves the hide structure, and leather is produced. After the tanning process 5, tanning fluid is pressed out by way of a press, during so-called sammying 6, so that the moisture content is reduced to approximately 50 to 60%. Subsequent to sammying, so-called wet-blue sorting is carried out, into various leather grades, according to predetermined quality characteristics. In a further method step 7, the animal hides prepared in this manner are shaved, i.e. planed off to a uniform thickness on the order of 1 to 2 mm, on the back side, by means of a spiral blade roller. The shaving chips, just like the waste products 20 during fleshing, are collected and passed to further processing or disposed of. The remaining leather can now be dyed and subsequently dried in method step 8.

An optional method step 9 is so-called dry splitting, which is carried out subsequent to dyeing and drying. Here, the leather thickness can be equalized and adjusted to a desired dimension. The tanned, dyed, and dried leather is also referred to as crust leather. After crust sorting 10, which is also carried out according to predetermined quality characteristics, dressing of the leather finally takes place in method step 11. This means a chemical surface coating in which a primer, a color layer, and subsequently a protective varnish are applied to the surface. Optionally, priming can be followed by embossing of the leather, which leads to characteristic surface structures. The result of this surface treatment is the so-called finished leather 12, which is also referred to as standard leather. In the case of a finished leather that is predominantly used in the automotive sector, one still has material thicknesses between 1 and 2 mm. On the other hand, the automotive industry strives to achieve weight savings.

Accordingly, a particular feature of the invention consists in that proceeding from the finished leather 12, a light leather is produced, which meets great requirements with regard to stretchability and tensile strength, and can be processed, in simple manner, using saddlery technology. For this purpose, the finished leather is passed to a dry-splitting machine in a method step 13, and divided up, in a splitting process, into a high-quality thin leather 14 having a wall thickness of approximately 0.4±0.1 mm, and an intermediate split leather 15 that is also accessible to leather processing. However, the thin leather produced in this manner does not yet meet the requirements regarding stretchability, tensile strength, and tear resistance that are prescribed for leather use. In order to achieve this, another particular feature of the invention consists in that the thin-leather cutouts 14 cut to size in a punching machine are laminated on the back with a suitable lamination material. For this purpose, lamination cutouts complementary to the thin-leather cutouts are produced from textile, plastic, fiber and/or foam material, which is lighter as compared to leather, and laminated onto the back side of the complementary thin-leather cutouts, covering their full area, with the formation of light leather parts 18. Here, the lamination cutouts have the task, above all, of increasing the tensile strength and the tear resistance of the light leather parts, without any significant increase in weight. At the same time, the feel of the light leather parts 18 can be influenced by means of a corresponding selection of the material composition in the lamination cutouts. An important criterion for the material selection furthermore consists in that the stretchability of the thin leather and of the lamination material are coordinated, one with the other, in such a manner that the thin leather does not tear before the lamination material in the case of mechanical stress.

In the dry-splitting station 13, an intermediate split leather 15 additionally occurs, which can be processed by means of saddlery technology, either directly or after corresponding treatment. In particular, the intermediate split leather 15 is first dressed on its surface, for example dyed, varnished, and optionally embossed. Subsequently, the intermediate split leather is cut to size in a punching process, for further processing, with the formation of predetermined intermediate split-leather cutouts, and, if necessary, split to a desired wall thickness. To improve the mechanical properties, the intermediate split-leather cutouts can optionally be laminated to a lamination material on their back side. In this connection, the intermediate split-leather parts 19 are formed.

For the production of the lamination cutouts, a multi-layer loom-knitted textile, for example a spacer-loom-knitted fabric, is used, above all in the case of the light leather parts, which fabric has a wale layer enclosed between two loom-knitted fabric layers in sandwich-like manner.

In FIG. 1, the method steps that lead to a change in the material thickness are indicated with a double border. In the schematic according to FIG. 2, the progression of the material thickness during the production process is indicated schematically in an enlarged sectional representation. The reference symbols in FIG. 2 correspond to the consecutively numbered method steps in FIG. 1. Proceeding from the rawhide 1, the hide residue 20 that occurs after method step 3, during the course of fleshing, and the shaving chips 21 that occur according to method step 7, during the shaving process, are disposed of or passed to further processing. The particular feature of the invention begins with the finished leather 12, which is divided up into the thin leather 14 and the intermediate split leather 15 in the course of a dry-splitting process 13. The light leather parts 18 and intermediate split-leather parts 19 that are accessible to further processing by means of saddlery technology bear a lamination layer, in each instance, in the exemplary embodiment shown, which layers are applied in the lamination stations 16 and 17, bringing about an increase in wall thickness.

In summary, the following should be stated: The invention relates to a method for the production of leather parts 18 that can be processed using saddlery technology, from pre-manufactured finished leather 12, for the automotive sector. The finished leather is split up in a splitting process 13, with the formation of a cohesive and closed thin-leather hide 14, having a proportional wall thickness, with reference to the finished leather, of 15 to 50%, and an intermediate split-leather hide 15 having a proportional wall thickness of 50 to 85%. Then the thin-leather hide 14 is cut to size in a punching process, with the formation of predetermined thin-leather cutouts, and laminated to lamination cutouts that are complementary to them, made from textile, fiber and/or foam material, which is specifically lighter as compared to leather, over their full area, on their back side. Fundamentally, the intermediate split-leather hide can also be dressed, cut to size, and, if necessary, split to a desired wall thickness and laminated, with the formation of intermediate split-leather parts 19, which can be processed by means of saddlery technology.

The invention claimed is:

1. Method for the production of leather parts that can be processed using saddlery technology, consisting of the steps of,
    washing, depilating and scraping a raw animal hide,
    splitting the raw animal hide up in a fleshing process and disposing the occurring hide residue,
    tanning the remaining raw animal hide and pressing it out to reduce the moisture content,
    shaving the tanned animal hide on its backside and planning off to form crust leather with a uniform thickness of 1 mm to 2 mm, and disposing the occurring shaving chips,
    dyeing and drying the crust leather and subsequently treating its surface to form finished leather,
    splitting the finished leather up in a splitting process, with the formation of a cohesive and closed thin-leather hide, having a proportional wall thickness, with reference to the finished leather, of 15 to 50%, and an intermediate split-leather hide having a proportional wall thickness of 50 to 85%,
    cutting the thin-leather hide to size in a punching process, with the formation of predetermined thin-leather cutouts, wherein the treated surface of the thin-leather cutouts is the front, and the opposite non-treated surface is the back of the thin-leather cutouts,
    producing lamination cutouts that are complementary to the thin-leather cutouts from textile and/or plastic material, which is specifically lighter as compared to leather, and
    laminating the lamination cutouts on the back of the thin-leather cutouts, over their full area, forming light leather parts.

2. Method according to claim 1, wherein the intermediate split-leather hide is dressed on its surface, and subsequently cut to size in a punching process, with the formation of predetermined intermediate split-leather cutouts, and, if necessary, split to a desired wall thickness,
    wherein lamination cutouts made of textile, fiber and/or foam material, which are complementary to the punched leather cutouts, are produced, and
    wherein the lamination cutouts are laminated onto the back side of the complementary intermediate split-leather cutouts, forming intermediate split-leather parts.

3. Method according to claim 1, wherein the lamination cutouts are configured as multi-layer loom-knitted textiles.

4. Method according to claim 3, wherein two loom-knitted fabric layers of the multi-layer loom-knitted textiles have different expansion values and/or tensile strengths.

5. Method according to claim 1, wherein the lamination cutouts are configured as spacer-loom-knitted fabrics having a wale layer enclosed between two loom-knitted fabric layers in sandwich-like manner.

6. Method according to claim 1, wherein the lamination cutouts have a greater tensile strength on their side that faces the thin-leather cutout or the intermediate split-leather cutout than on their other side.

7. Method according to claim 1, wherein the lamination cutouts have an elastic layer on their broad side facing away from the thin-leather cutout or the intermediate split-leather cutout.

8. Method according to claim 1, wherein the splitting process is carried out using a rotating band blade having an asymmetrically ground cutting wedge, and
    wherein only the side of the cutting wedge that is less ground faces the thin-leather hide to be produced.

* * * * *